United States Patent [19]

Knapp

[11] Patent Number: 4,518,302
[45] Date of Patent: May 21, 1985

[54] SYSTEM AND PROCESS FOR AUTOMATIC STACKING, STORAGE AND WITHDRAWAL OF PACKAGED MERCHANDISE IN LARGE WAREHOUSES

[75] Inventor: Gunter Knapp, Hart-St. Peter, Fed. Rep. of Germany

[73] Assignee: Ing. G. Knapp Ges.mgH & Co. KG, Fed. Rep. of Germany

[21] Appl. No.: 482,528

[22] Filed: Apr. 6, 1983

[30] Foreign Application Priority Data

Apr. 7, 1982 [DE] Fed. Rep. of Germany ....... 3213119

[51] Int. Cl.³ .............................................. B65G 1/02
[52] U.S. Cl. ..................................... 414/273; 221/13; 221/93; 414/136; 414/786
[58] Field of Search ............... 414/131, 136, 276, 112, 414/273; 198/356, 359, 366, 472; 221/93, 94, 15, 95, 13; 186/55, 69; 53/247, 251, 534, 543, 537

[56] References Cited

U.S. PATENT DOCUMENTS 3,144,958  8/1964  Gumpertz ......................... 221/15 X
3,313,449  4/1967  Parks ................................ 186/55 X
3,541,309  11/1970 Cutter .............................. 186/55 X
3,881,633  5/1975  Bradt ................................ 221/123

OTHER PUBLICATIONS

Supreme Equipment and Systems Corporation, 1969, IBM's Own Data Processing Center Saves Space and Automates Its Tape Reel Library with Conserve-A-Trieve, Supreme's Electronic Random File.

Primary Examiner—Robert J. Spar
Assistant Examiner—Lyle Kim
Attorney, Agent, or Firm—Steinberg & Raskin

[57] ABSTRACT

A system and process for the automatic stacking, storage and withdrawal of packaged merchandise in large warehouses, the handling of the merchandise being controlled by a computer, so that the merchandise is withdrawn from shelves and loaded into passing transport containers. The shelves are subdivided into blocks for several product types. The merchandise pieces making up a single order, which are then ejected simultaneously at each block once the transport container has arrived at the preceding block, are collected and then simultaneously loaded into the transport container when the latter arrives at the proper block. After loading, the transport container is allowed to continue and the speed of the transport container is determined by the withdrawal, collection and loading times in such a way that the release of the merchandise of the entire warehouse occurs in a minimal time.

17 Claims, 10 Drawing Figures

SYSTEM AND PROCESS FOR AUTOMATIC STACKING, STORAGE AND WITHDRAWAL OF PACKAGED MERCHANDISE IN LARGE WAREHOUSES

BACKGROUND OF THE INVENTION

The present invention pertains to a process and system for the automatic stacking, storage and removal of packaged merchandise from large warehouse installations of the type wherein the handling of the merchandise is controlled by a computer. In particular, the invention relates to a process system wherein the merchandise is withdrawn sequentially from several shelves provided with product magazines and loaded into passing transport containers.

Increasing demand is being made upon wholesale suppliers due to the growing variety of product lines being offered on the market in Western industrialized countries. For example, pharmacists are supplied by wholesalers who often have to deliver several thousand articles of different types within the shortest possible time.

Presently, most large-scale warehouse operations are conducted manually. More particularly, each warehouse clerk removes the required number of merchandise items indicated on an order slip from the particular section of product magazines for which he is responsible, whereupon the items are loaded into a transport container located next to the clerk. The transport container moves from one warehouse clerk to the next where it is again stopped for loading. This mode of warehousing or merchandise withdrawal results, on the one hand, in a high cost factor and, on the other hand, necessitates a great degree of labor. Even more importantly from the viewpoint of the wholesaler than the cost factor is the speed with which an order is filled. Thus, it is a well known fact, particularly in the pharmaceutical industry, that wholesalers differ from each other essentially only in the length of delivery times required.

For the above reasons, processes and systems for the automatic withdrawal of packaged merchandise from large warehouses have recently been proposed.

A system for storing packaged merchandise in horizontal magazines is disclosed in U.S. Pat. No. 3,881,633. In order to remove the merchandise from the magazines, a plunger, which is movable along the entire length of the magazine by a chain drive, pushes the stack of merchandise items in a manner such that the forwardmost ones of the items fall over the forward edge of the magazine onto a conveyor belt running beneath the magazines. However, on the one hand, this device is exceedingly difficult to load and, on the other hand, it is relatively expensive due to the particular design of the plunger. Furthermore, the merchandise items forming a part of a particular order are situated on the conveyor belt along with other items unless special steps (not indicated in the references patent) are taken to prevent this from happening.

In another design disclosed in the above-identified patent, a separate gripping device is disclosed which moves along the row of magazines to extend into the magazines to eject a number of pieces, determined by a computer, over the forward edge of the magazine onto a conveyor. The conveyor then delivers the batch of items belonging to a single order to transport containers which are successively directed to the conveyor. However, even in such an arrangement, it is extremely difficult and time-consuming to separate the items of one batch arriving on the container from items of other batches and to load these items separately into the various transport containers.

Additionally, it is not possible even with these two automatically operating mechanisms to withdraw items while the magazines are being filled. As a result, at least a portion of the mechanism must be shut down when individual magazines are being filled, such shut-down naturally disrupting the operation of the entire system unless the withdrawal of the items over the entire system is temporarily halted. On the other hand, since it is not possible to design the magazines to be sufficiently large to contain the requirements of an entire day (too many packages would be squeezed against each other during withdrawal), the withdrawal of merchandise will be unavoidably delayed several times during the course of the day. Thus, the operation of the entire installation must be halted if even only a single magazine must be restocked.

SUMMARY OF THE INVENTION

Accordingly, it is an object of the present invention to provide new and improved processes and systems for the automatic stacking, storage and removal of packaged merchandise in a warehouse.

A specific object of the present invention is to provide a new and improved process and system for the automatic stacking, storage and removal of packaged merchandise in a warehouse in which an order for several different types of items can be filled in the shortest possible time and in the shortest possible space, without the process of withdrawing the items being interrupted during the refilling of the magazines.

Briefly, in accordance with the present invention, these and other objects are attained by providing a process wherein various types of packaged merchandise are loaded into the magazines at the same time as they are being removed from the shelves. The shelves are divided into blocks of several different merchandise types. Through the use of a remote-control ejection mechanism, when the transport container has arrived at a preceding block, the merchandise items are collected and then simultaneously loaded into the transport container when the latter arrives at the appropriate respective block. The transport container is then permitted to continue its movement immediately after it has been loaded, the speed of the transport container being determined by the sum of the withdrawal, collection and loading times, the removal taking place therefore in a minimal time.

According to the system of the present invention, the shelves are subdivided into blocks with several shelf floors having the product magazines attached to them. The shelf floors are tilted vertically, i.e., are arranged obliquely with the normals to the planes in which they are situated extending in the substantially longitudinal direction of the shelf floors. The magazines have ejectors provided at their lower end regions which transfer the merchandise to conveyor means which collect the ejected merchandise of one block in a release mechanism from which the merchandise is loaded into the transport containers mounted on the conveyor means for their removal, the activation of the system components being controlled by a computer. The system is further characterized by the fact that the replacement items to be stacked are located in the transport containers for stacking, these containers being directed along other paths than are the transport containers which are used for the unloading of the ejected components.

The process of the present invention carried out by the system of the invention results in the time for the execution of an order which may consist of a number of different product items to be reduced to a fraction of that required by prior art arrangements and processes. Moreover, the individual items belonging to a single order will remain reliably separated from products of other orders. The transport containers assigned to individual orders will proceed without any significant waiting time through the block or shelf rows even where a number of magazines must be refilled during the course of the operations. Since the transport containers proceed beneath the shelf rows and only refilling carts are required to be pushed between the shelf rows, the system of the present invention requires substantially less space than would be required by conventional installations. Moreover, a warehouse designed in accordance with the invention is significantly more cost-effective than previously known warehouses due to the simplicity of the delivery and conveyor means.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1A:
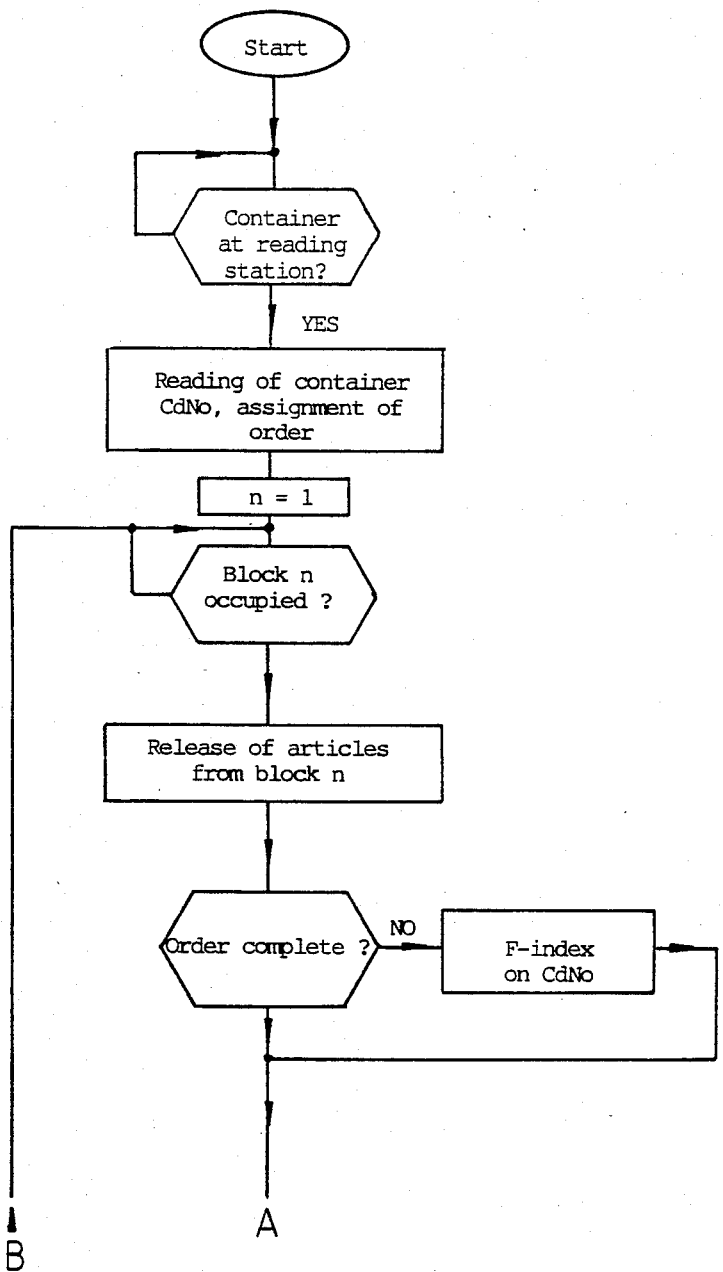
FIGS. 1A and 1B illustrate a flow chart of a process in accordance with the present invention.
Figure 1B:
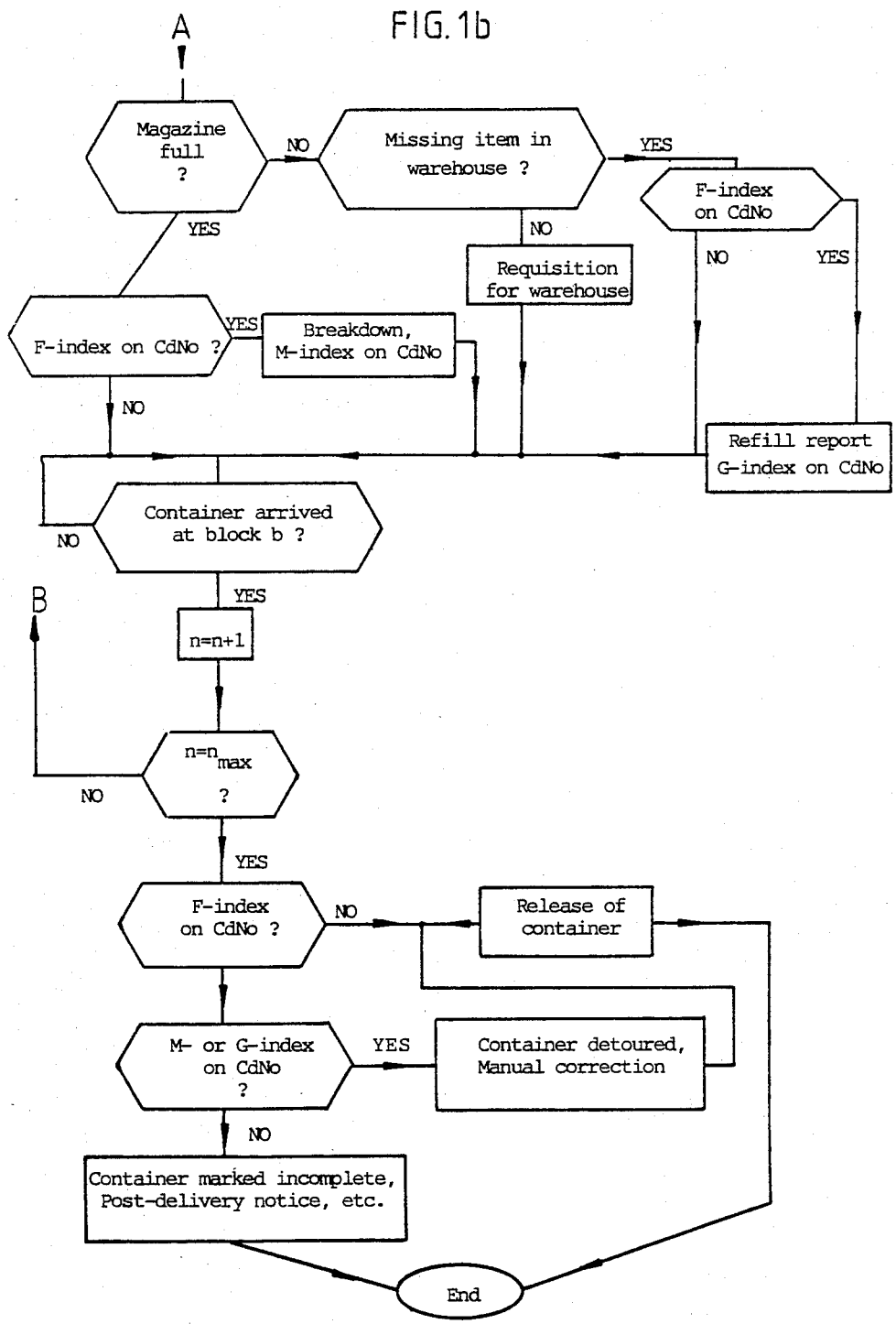
Figure 2:
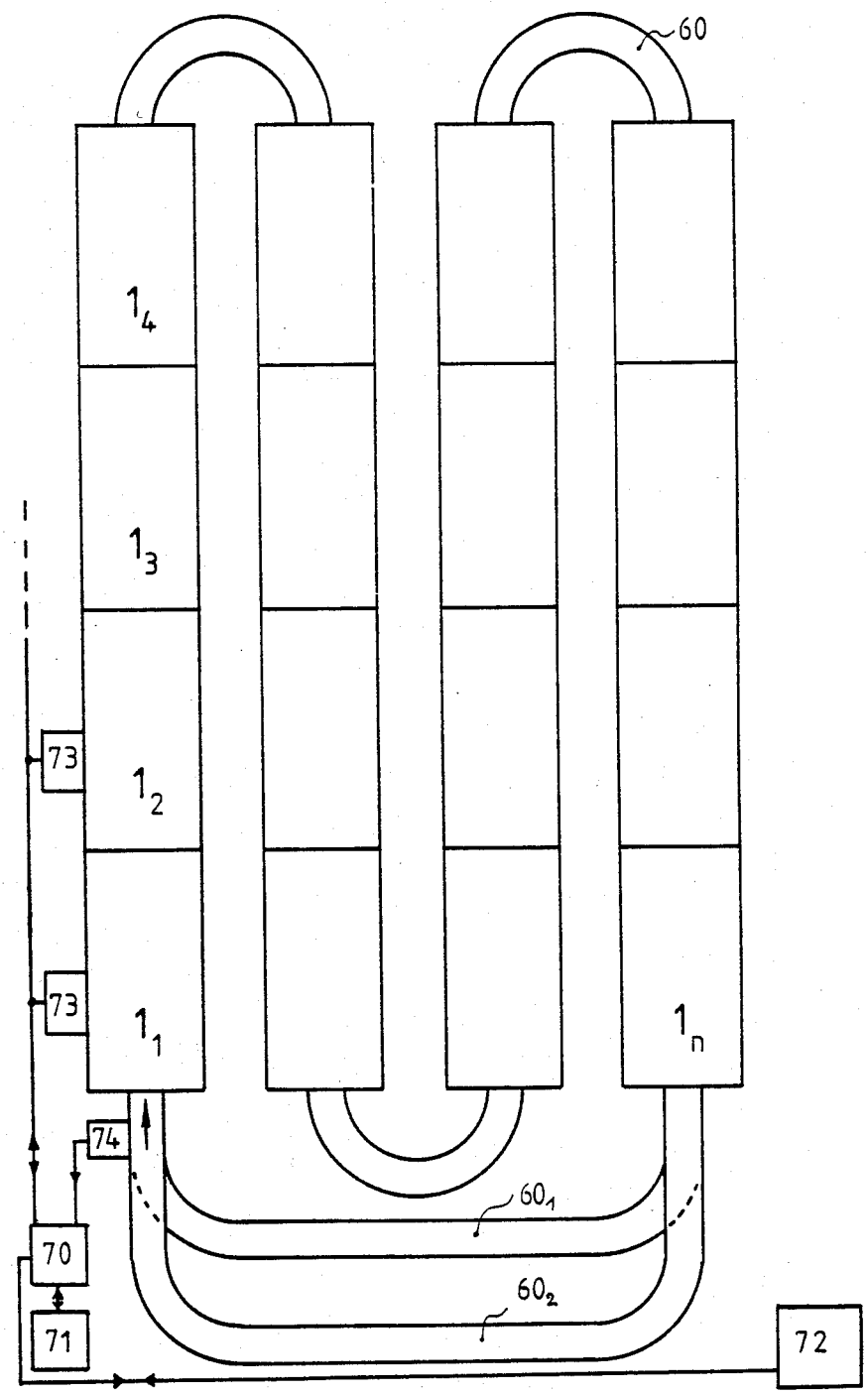
FIG. 2 is a schematic illustration of shelf blocks forming a part of the system of the present invention.

With reference to FIGS. 1 and 2, the filling of an order for merchandise items in accordance with the process of the present invention will be described. A warehouse is schematically illustrated in FIG. 2, the shelf blocks $1_1$ to $1_n$ being illustrated. The blocks are connected to each other by an endless conveyor belt 60 so that the conveyor belt 60 has branches which subdivide the same between the beginning and the end of the blocks $1_n$ into two partial sectors $60_1$ and $60_2$ which can be selectively controlled. Further, the system includes a computer 70 having an input unit 71 which is connected, such as by an IEEE-bus with each block control and sensor computer $73_1$ to $73_n$.

Although the process illustrated by the flow diagram of FIG. 1 is for the loading of a single transport container 3 mounted on the conveyor belt 60, it will be understood that this operation will occur simultaneously for a number of containers 3 in succession.

Upon an order comprising a number of merchandise items being fed into the computer 70 through the input unit 71, the program or process indicated in FIG. 1 is begun. The computer asks the reading station 74 whether a container 3 has arrived at the reading station and waits as long as necessary (by means of a loop) until a container 3 has arrived in an appropriate position in front of the reading station. As soon as the container 3 arrives in front of the reading station, a code number (CdNo) 4 marked on the container is read. Each of the containers used in the warehouse is provided with a different fixed code number. In the further course of the process, the particular order which has been fed into the computer is assigned this code number which may be provided with additional index markings in further process steps.

After assignment of the order to a specific container by means of assigning that order the particular code number associated with that specific container, a numerator, e.g., $n=1$, is set and the actual program loop begins. The computer asks whether the block n (in this case, the first block) is already occupied, i.e., whether the release mechanism (discussed below) of the block has already filled the previous order or not. If the block computer $73_n$ reports that the block is still occupied, the computer waits and continues the question (whether the block n is already occupied) until that block is unoccupied.

As soon as the block becomes unoccupied, the order is issued from the computer to the block computer $73_n$ to eject all of the items contained in the order and which are stored in that particular block. This command can be processed in the computer 70 by comparing the command to the inventory data stored within the computer for the block n, the computer then issuing an ejection command. However, it is also possible to compare the total order coming from the computer 70 with the inventory stored in the block computer $73_n$ by means of an appropriate electronic control device and then to fill the partial order. In the event that a number of pieces of a merchandise item are required, then the repeated release, i.e., the control of two equally filled magazines, can be carried out by both the computer 70 and the block computer 73 as will be described hereinbelow.

When the ejection command has reached the block computer $73_n$, the latter reports whether all of the items ordered have actually been released or ejected. The information indicating the completion of the ejection of the items is determined by the block computer $73_n$ from sensors 21 arranged on the magazines and, in particular, on the ejectors of the magazines, these sensors being described in greater detail below. If any item of the order has not been released, then the container code number receives an F-index mark which is retained until completion of the entire order.

In the next step, the block control computer $73_n$ is asked whether all the magazines are sufficiently filled, this information again being obtained through the sensors 21. If all of the magazines are not sufficiently filled, the computer asks its memory whether the missing item is in stock at the main storage complex whose inventory is stored in the computer memory. If the article is in stock, the computer requests whether the container code number carries an F-index. If the container indeed carries such an index mark, then a report is issued to the warehouse staff that the particular magazine must be refilled and the container code number receives an additional index number, namely a G-index mark. As the next step in the process, the computer asks whether the container has arrived at the block n? If the missing merchandise item is not in stock in the main storage complex, then a requisition order is transmitted to the main storage complex, following which comes the step wherein the computer asks whether the container has arrived at the block n?

If the product magazine was full at the time that the F-index was assigned to the code number, then a breakdown report is transmitted to the warehouse staff and the code number receives an M-index. It will be understood that this breakdown report will be correct even though the magazine was full since the order was not filled. Therefore, the breakdown must be present in the release mechanism. Subsequently, the step wherein the computer inquires whether the container has arrived at the block n? is again carried out. If the container has not been assigned an F-index to the code number, then the step "has the container arrived at block n?" is executed.

If the step "has the container arrived at block n?" is responded to in the negative, then the program waits in a loop. As soon as the container has arrived at the block n, however, the numerator n =n+1 is set and the computer inquires whether n=$n_{max}$. In this instance $n_{max}$ indicates the total number of the blocks 1 of the warehouse which have already been passed. If all of the blocks have not been passed, the computer, in its loop, jumps to the question "is block n occupied?", beginning the procedure of instruction, release, etc., for the next block (n =n+1).

However, if all of the blocks have been passed, i.e., n=$n_{max}$, then the code number is surveyed to determine whether it bears an F-index. If this is not the case, then the container is released and the container, for example, is directed to the path $60_2$ as shown in FIG. 2. A warehouse clerk can hand the completed order to the delivery staff whereupon the order is completed and the container can be used for the next order.

If the code number of the container carries an F-index, then the code number is scanned to determine whether it also carries an M- or G-index. If this is the case, then the container is directed to the path $60_1$ and a warehouse clerk will receive a command to supply the missing order manually, since these missing merchandise items are in stock in the magazine (in the case of a M-index) or in the main warehouse (in the case of a G-index). Subsequently, the container is released and again directed back into the conveyor cycle.

If the code number of the container does not bear a M- or G-index, then the order is not yet completely filled and, moreover, cannot be filled manually since the missing article is no longer in stock in the entire warehouse inventory. The computer then indicates the deficiency report and, if necessary, a resupply date. The container can be given to the delivery staff with an indication that the order is incomplete whereupon the order is filled to the extent possible and the container then again directed back to the conveyor cycle.

It should also be understood that in addition to expediting an order in the manner described above, the computer may also advantageously be simultaneously employed for inventory control, bookkeeping, etc., and the input unit 71 may be used for input and output of data, namely invoices, orders and the like.

It will be seen that the process described above will effect an actual release of merchandise from a magazine block $1_n$ only when the transport container 3 has arrived at the preceding magazine block $1_n-1$. In this manner, the travelling time of the transport container 3 from one magazine block $1_n$ to the next magazine block $1_n+1$ will be reliably used to initiate the release of merchandise. In this manner the transport containers will move through the shelf rows at a maximum speed.

Moreover, it is important to note that the release of merchandise does not occur in a serial manner, i.e., article by article, but that all merchandise items can be ejected from their magazines simultaneously since an ejector is arranged at each magazine. The merchandise items are then simultaneously moved by transport means, described below, to a common collecting point for each block and simultaneously released to the container 3. During the simultaneous movement of the articles by the transport means to the common collecting point, the articles ejected from the various magazines are directed, preferably, to two conveyor belts which run in opposite directions from the beginning and the end, respectively, of a block, to a collection mechanism situated at the substantial center of the block. In this way the release time as well as the "collection time" for the articles is minimized.

If a merchandise item is desired more than once in a single order, either the ejector can be activated more than once (for the appropriate item) or, if the article is in particularly high demand, several magazines in a single block 1 can be filled with that particular item. The release of the items takes place in an optimal fashion if the ejector of the first magazine ejects one item, while the ejector of a second magazine ejects two items, the ejector of a third magazine ejects 4 items, progressing in this manner by factors of 2. For example, if each ejector is permitted to release a certain number of items up to two times in succession, then the first ejector is permitted to eject a single item, the next ejector releases 3 items, the next after that releases 9 items, i.e., in factors of 3. The choice of whether it is more time-effective to activated an ejector only once or several times depends upon the maximum speed of ejection which in turn depends upon how fragile the merchandise item to be withdrawn is.

It is, of course, also possible to control the ejector by means of an electronic control mechanism so that it ejects one or several merchandise items as desired.

Referring now to FIGS. 3-9, a number of typical embodiments of the components of a system for carrying out the process described above will now be described.

Figure 3:
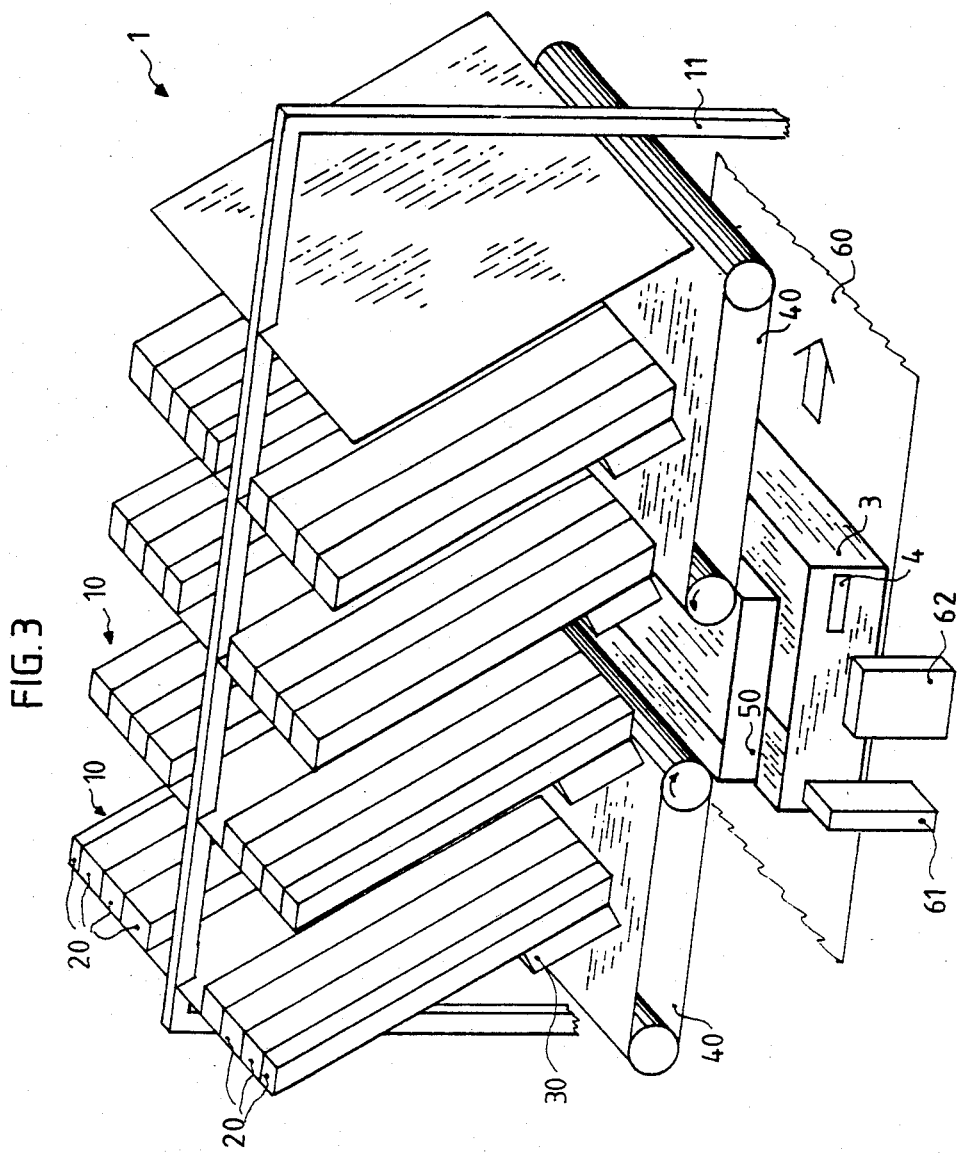
FIG. 3 is a perspective view of a shelf block forming a component of the system of the present invention.

Referring to FIG. 3, a shelf block 1 is illustrated which comprises several shelf floors 10 fixed in a frame 11. The position of the shelf floors 10 upon which the product magazines 20 are arranged, is such that the shelf floors extend obliquely to the longitudinal direction of the block. The planes of the shelf floors 10 are thus perpendicular to the vertical and are tilted to the longitudinal direction of the block, i.e., to the horizontal.

An ejector 30 is arranged beneath each product magazine 20. The ejector 30 ejects the merchandise items 2 which are stacked in the product magazines 20 onto the conveyor belts 40 arranged beneath the shelf floors 10.

The conveyor belts are preferably kept in constant operation to convey the ejected items to a release mechanism 50. The release mechanism 50 is preferably arranged in the center of the block 1, the conveyor belts 40 thus running in opposite directions carrying the merchandise items as shown in FIG. 3 towards the center of the block. More particularly, the items ejected from the two right-hand magazines are conveyed towards the left while those items ejected from the two left-hand magazines are conveyed towards the right.

A conveyor belt 60 is arranged below the blocks 1 upon which the transport containers 3 are moved from shelf block to shelf block.

During their motion on the conveyor belt 60, the transport containers 3 pass by code readers 61 which read the code numbers 4 affixed to each transport container 3 and convey the information to the block computer 73. This reading operation can take place either by way of magnetic symbols or optically, e.g., through the use of reflecting light barriers. Gripping devices 62 are arranged on both sides of the conveyor belt 60, preferably below the release mechanism 50, which catch a passing transport container 3 to detain the same. The conveyor belt 60 is designed such that while it can easily move the transport containers 3, the conveyor belt 60 continues to move below them while the transport containers 3 are being held in place by the gripping devices 62.

Figure 4:
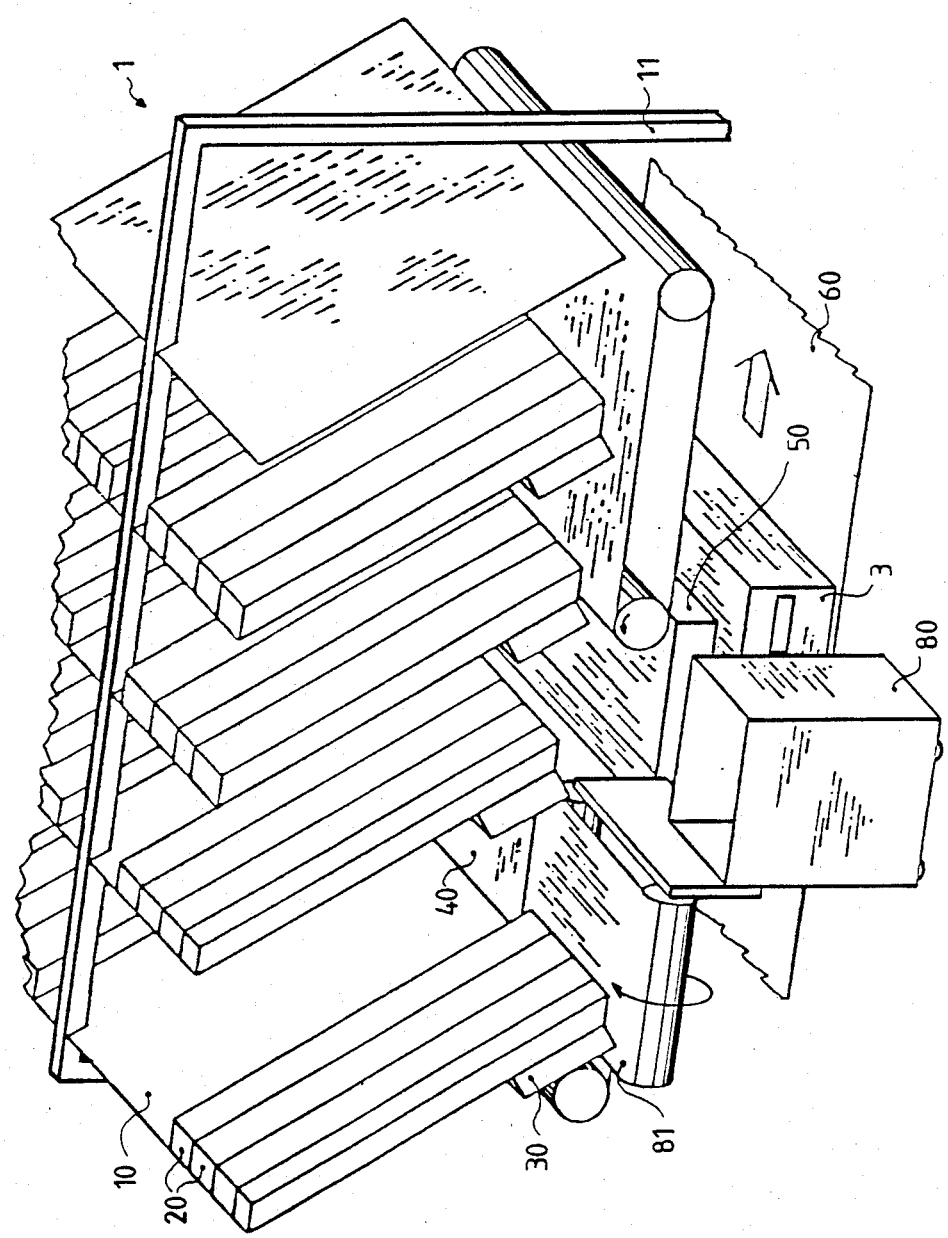
FIG. 4 is a view similar to FIG. 3 illustrating a shelf block during the refilling of the magazines thereof.

The refilling of the magazines is shown in detail in FIG. 4. In order to maximize both the simplicity and speed of the refilling operation, the shelf floors are preferably situated upon telescoping guide rails (not shown) in a manner such that they can be extended or withdrawn from the block, in the manner of obliquely seated drawers, and are accessible from a position in front of them in their withdrawn position whereby the ejectors 30 are, of course, withdrawn from the shelf floors 10, i.e., from the product magazine rows 20.

In order to insure that the automatic release operation does not have to be stopped each time, even in the case where only a single product magazine is being refilled, a refilling container 80, in which the inventory products are conveyed by a warehouse clerk, is equipped with a conveyor belt 81. This conveyor belt 81 is inserted beneath the particular shelf floors 10 so long as the magazines 20 thereof are being refilled. If merchandise items should happen to be ejected from the magazines which are at that time being refilled, then the ejector 30 ejects those particular items onto the conveyor belt 81 which then conveys the items to the conveyor belt 40, from which the items reach the release mechanism 50 in an appropriate fashion.

It is clear from the foregoing that in this manner a smooth product release operation is obtained on the one hand and, on the other hand, only a relatively narrow access between the shelf blocks 1 need be provided. In this manner an optimal use of the entire storage area can be achieved.

The construction and operation of the ejectors 30 will now be described in greater detail.

Figure 5:
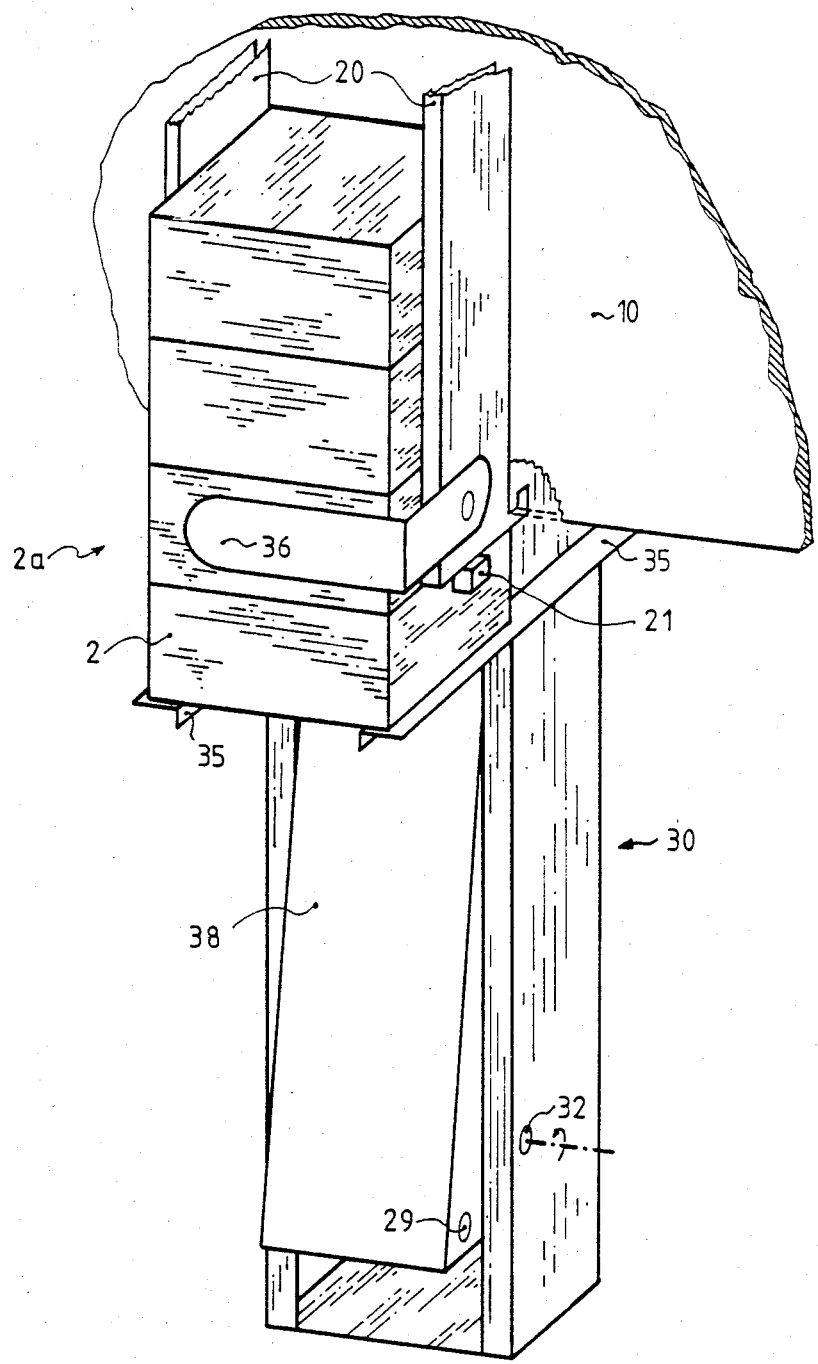
FIG. 5 is a perspective view of an ejector associated with a magazine.

Referring to FIG. 5, the magazines 20 are fixed to the shelf floors 10. The magazines 20 include a pair of separate rails which, for example, are hooked at their lower sides in place by catches on the shelf floors 10 and are locked in place by springs (not shown) against the upper side of the shelf floors 10. In this way the magazines can be easily adjusted to correspond to the width of the merchandise items 2 which they are to receive.

Skids 35 are arranged below the magazines 20 in a manner such that the bottom item of a product stack 2a stored in the magazine 20 rests upon them. In the illustrated embodiment, the second piece as seen from the bottom is held in place by a retainer 36 which is fixed to the magazine so that the piece second from the bottom can only slide up or down in the direction of the magazine.

An ejector 30 is attached to the undersides of the shelf floors 10 or, if desired, at the magazines 20 the ejector having a lever 38 and a stop 29, capable of being pivoted around an axis 32.

Figure 6:
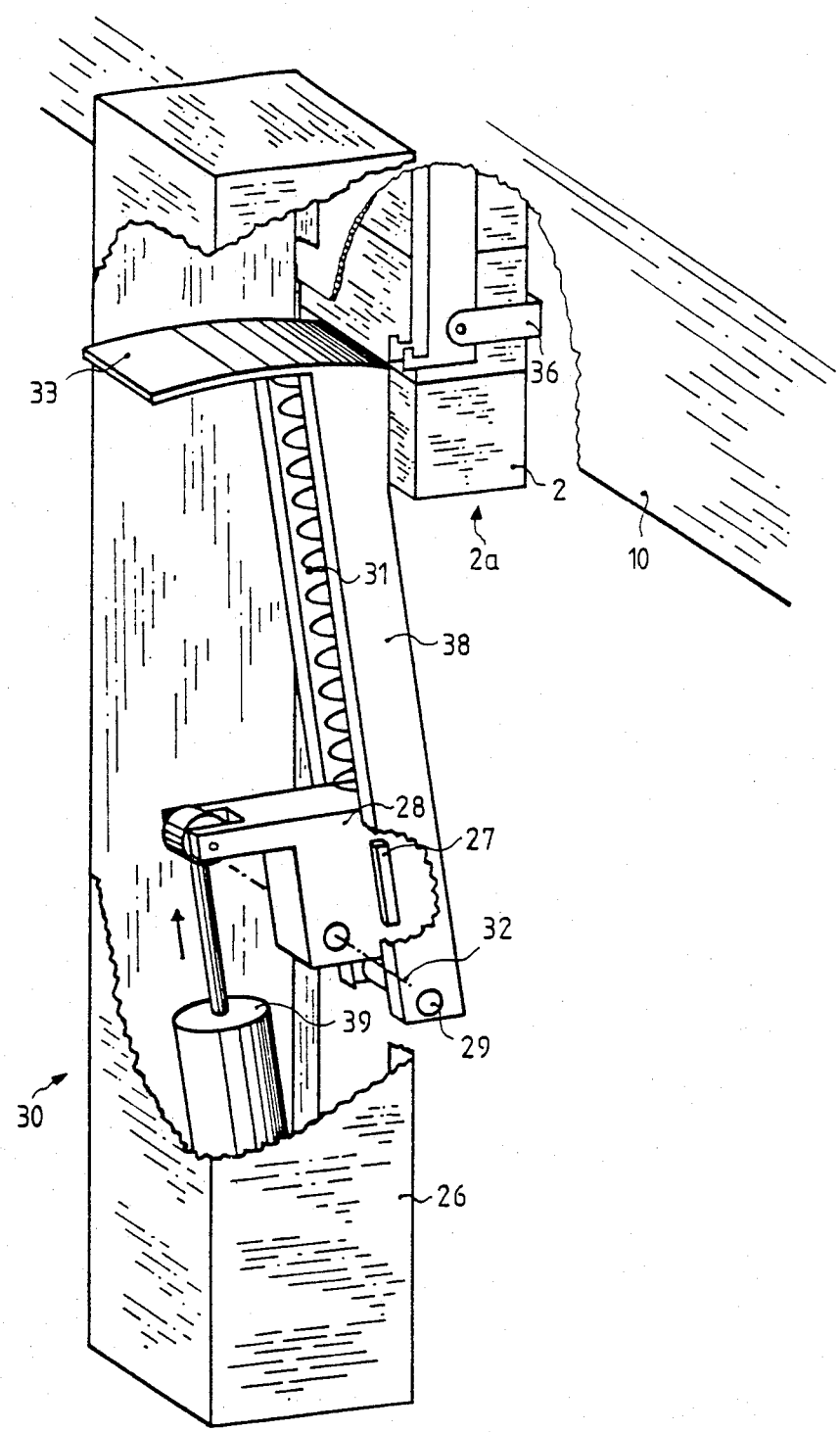
FIG. 6 is a perspective view partially broken away of the ejector illustrated in FIG. 5.

Referring to FIG. 6, a preferred design of an ejector is shown in detail. The ejector lever 38 is seated in an axle block 28 to be longitudinally adjustable. Such a seating arrangement is accomplished with the design of the lever 38 illustrated by supporting the side of the axle block which faces the lever 38 on an inner wall of the lever 38 so that the guide bars 27 of the axle block 28 are surrounded by the crimped side walls of the lever 38. In this instance the lever 38, as well as the entire ejector, is preferably manufactured from folded steel plate.

An extension 33 is formed on the upper side of the lever 38. Between the extension 33 and the axle block 28, a helical spring 31 is mounted under tension sufficient to displace the lever 38 sufficiently far toward the axle block 28 for a stop 29, attached below the lever 38, to contact the axle block 28.

The extension 33 has a curved surface construction, the center of its radius of curvature, when the extension is moved to engage the bottom merchandise item, coinciding with the pivot axis 32. The lever 38 is slightly bent in the region of the extension 33 relative to its remaining length. The bent portion provides a surface which will lie flat against the rear side of the bottom item 2 as shown in FIG. 6 when the lever is in its resting position.

The axis 32 of the lever 38 is mounted in the ejector housing in a manner such that the lever 38 can be pivoted about the axis, but not displaced along the same. The axle block 28 has an extension at its end which faces away from the lever 38 to which the moving part of the activating component 39 which is attached to the housing by a stationary part thereof, is pivoted.

As shown in FIG. 6, when the moving part of the activating component 39 moves in the direction of the arrow, the lever 38 pivots clockwise and ejects the bottom item 2 of the product stack 2a out from the magazine.

Figure 7:
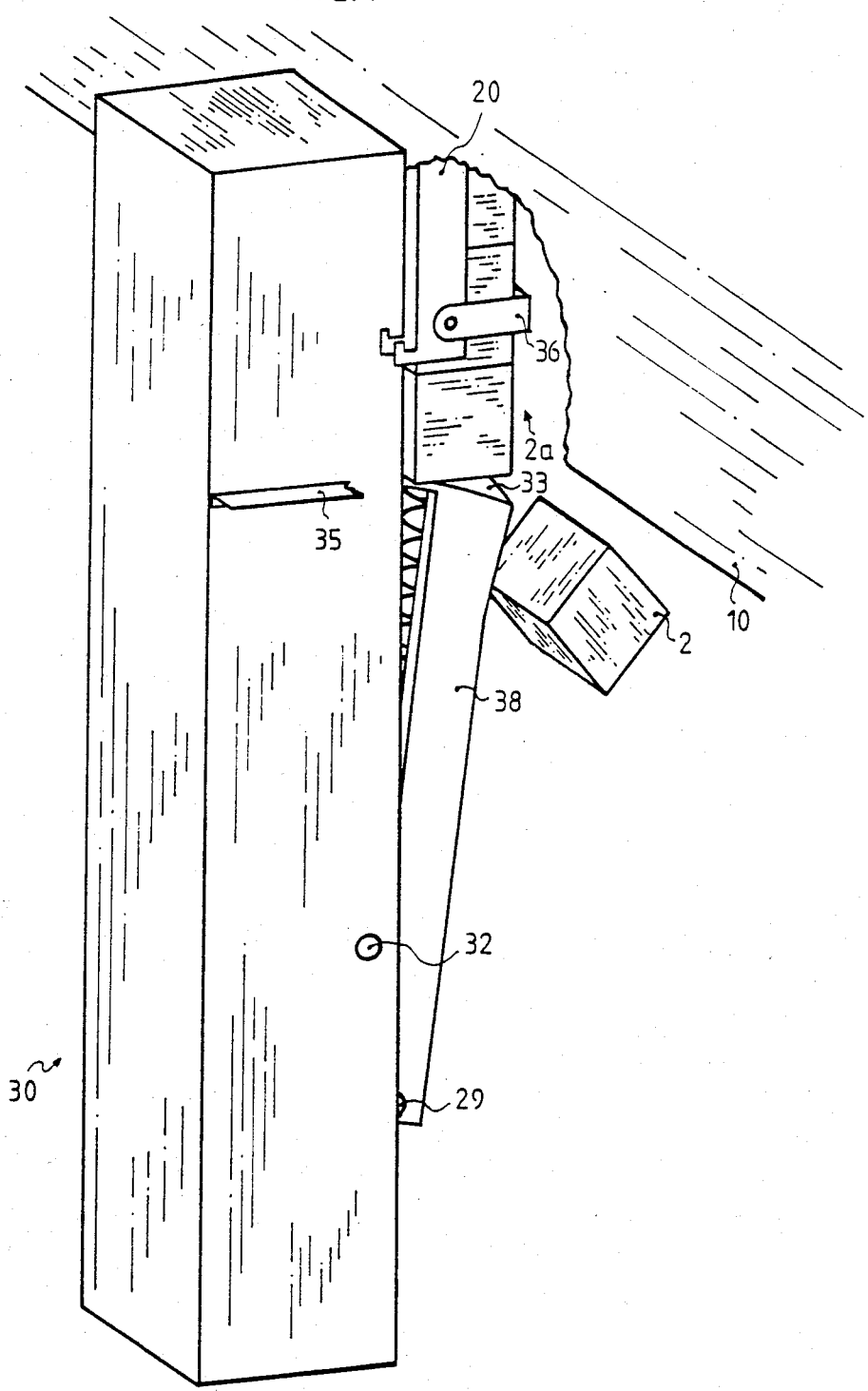
FIG. 7 is a perspective view of an ejector shown during the ejection operation.

This pivoting motion of the lever 38 is shown in FIG. 7 in greater detail. The lever 38 moves in a clockwise direction as seen in that figure, whereupon the bottom item 2 is ejected and falls while the product stack 2a presses the lever 38 against the force of the spring 31 in a downward direction such that the stop 29 is withdrawn from its striking position and the axle block 28. The lever is pressed back a sufficient distance for the bottom item of the product stack 2a to again come to rest on the support rails 35. This insures that the entire force generated by the weight of the product stack 2a will not come to bear upon the contact surface between the extension of the lever and the bottom surface of the bottom piece. In particular, only the force of the spring 31 will be in pressing engagement with the extension 33 against the underside of the bottom piece.

After the ejection of the bottommost merchandise item 2 from the magazine, the lever 38 again swings back to its original position whereupon the spring 31 presses the extension 33 upwardly relative to the axle block 28 as soon as the forward edge of the extension 33 arrives behind the bottom item 2 of the product stack 2a. The lever then assumes the position in FIG. 6 and a new ejection operation can begin.

The particular design of the ejection mechanism 30 including the ejection lever 38 ensures that when the lever 38 swings back to its starting position, only the friction caused by the force of the spring 31 will exist between the extension 33 and the bottom piece. In fact, it has been shown that if the lever 38 were designed as a rigid member, that damage to the merchandise items 2 during ejection is almost inevitable when the magazine is full. However, when the ejector is designed in accordance with the present invention, the stress exerted on the bottommost items by the ejector 30 is completely independent of the length of the magazine and the weight of the overlying merchandise items so that the ejector 30 can be used equally effectively for packages of various vulnerability.

Figure 8:
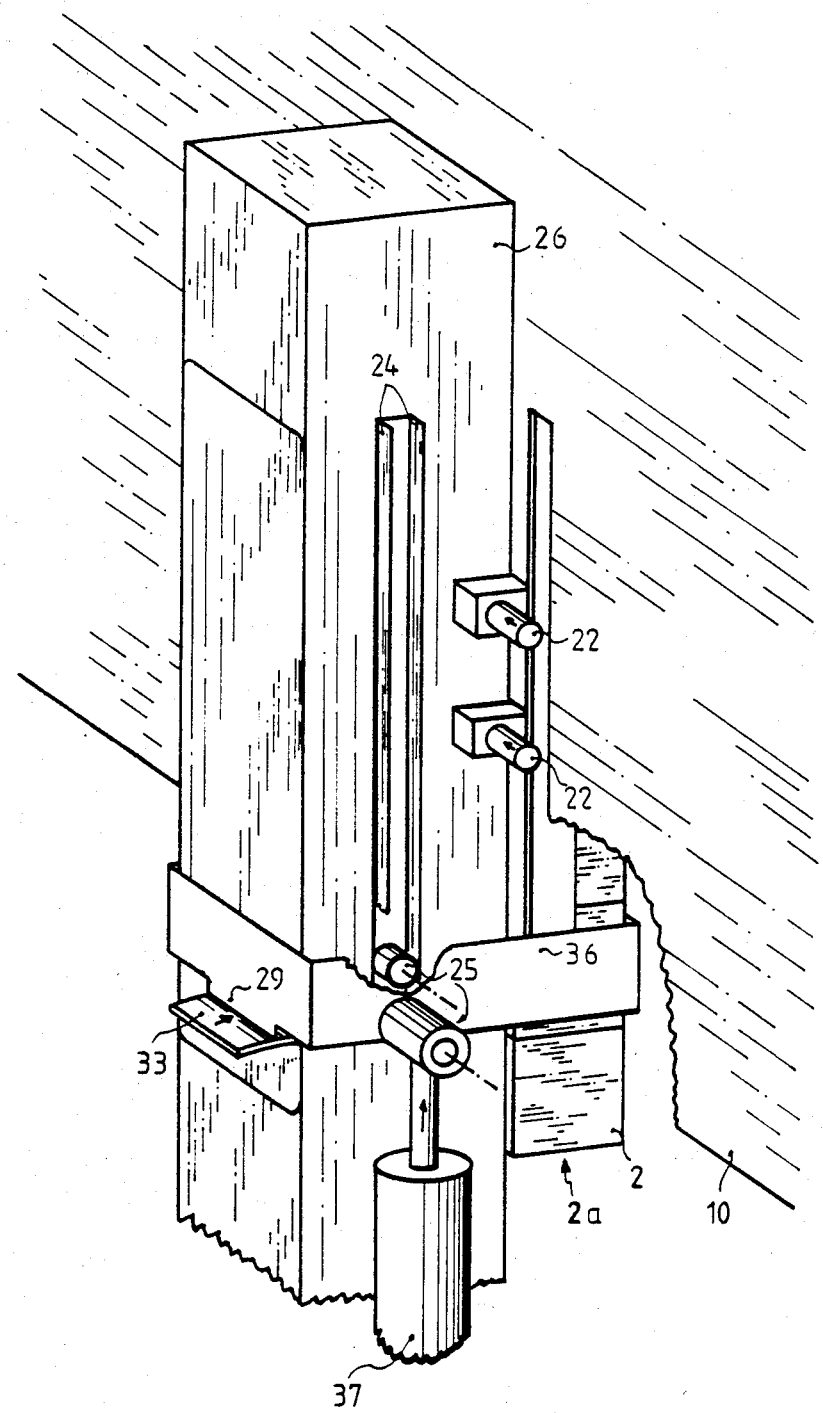
FIG. 8 is a perspective view of another embodiment of an ejector forming a component of the system of the present invention.

In another embodiment of an ejector in accordance with the present invention as shown in FIG. 8, the stop 29 is not provided at the lower end of the lever 38 but, rather operates upon the extension 33 of the lever. The stop 29 in this embodiment is connected to the retainer 36 which retains the item above the lowermost item in the magazine. The stop 29 and the retainer 36 can in this instance be adjusted by an activating element 37. Guidance of the stop 29 and the retainer 36 is accomplished through the use of guide rollers 25 which run in grooves 24 of the ejector housing 26. With correspondingly defined settings of the activating element 37, it is possible in this manner to eject one or more pieces 2 of the product stack as desired.

In yet an additional embodiment of the ejector, the activating element 37 can be replaced by a spring which can be in either tension or compression and which urges the retainer 36 and stop 29 against adjustable stops 22. In this case, the stops 22 are preferably fastened in a preadjusted manner with respect to their height to the ejector housing 26 and can, for example, be designed as spring-stressed cores of lifting magnets. The interval defined by the stops 22 can be accordingly chosen in a manner to correspond to the height of a merchandise item 2, the bottom stop 22 (not shown) being situated at a height which brings the retainer 36 and in particular the extension 33 into position for the ejection of a single item 2. Depending upon the number of the adjustable stops 22 that are retracted as seen from below, a corresponding number of items 2a will be ejected upon activation of the ejector. It is evident that it is within the scope of the invention to mount adjustable stops at other positions or to combine features of the illustrated embodiments with each other.

Figure 9:
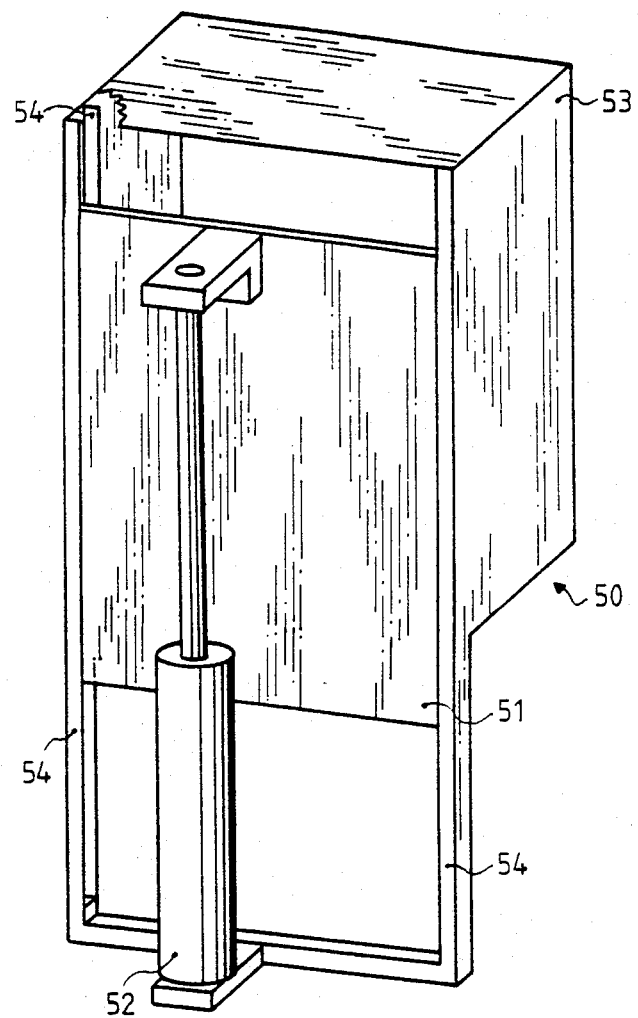
FIG. 9 is a perspective view of a release mechanism forming a component of the present invention.

When the ejector 30 associated with a block 1 has ejected the ordered items of merchandise onto the conveyor belts 40, the latter transport the items to the release mechanism 50, best seen in FIG. 9 which illustrates the release mechanism 50 from its underside. The release mechanism 50 includes a box 53 which is open at its top end and which has guide rails 54 disposed on its underside in which a sliding trap door 51 is mounted. The trap door 51 can be displaced by conventional moving means, such as a power cylinder 52 so that the box 53 has an underside which is either closed or completely open. Of course, the sliding trap door may be replaced by folding, i.e., pivoted trap doors although a sliding door of the type shown is preferable due to its minimal construction height.

The following beneficial features of the present invention should also be noted.

In the particular embodiment of the system of the invention described above, the orders are dealt with in blocks, each block dealing with a particular order in a single operation (unless an ejector is activated a number of times). In another proposed embodiment of the invention, several blocks are combined to form larger units which are connected by additional conveyor means. Such construction of course lies within the scope of the invention since the size of the block can, of course, be chosen within wide limits determined solely by optimal warehouse size.

As noted above, the shelf floors with the attached magazines are arranged obliquely in a manner such that their surfaces are inclined with respect to the horizontal. The magnitude of this inclination may also vary depending upon the optimum height of the stack, the length of the product magazines and the fragileness of the merchandise items stored. For example, if a large number of relatively heavy merchandise items are to be stored, then for a given predetermined height of the shelf block, the shelf floors must be arranged at a certain acute angle with respect to the horizontal. Generally, in such a case it is not sufficient simply to allow the merchandise items to slide to the shelf floors but, in addition, roller floors or the like providing a minimal friction between bearing surfaces and the merchandise items must be used.

All of the components of the system are activated and adjusted in a remote-controlled manner by the computer, preferably associated with each respective block. For this purpose hydraulic or pneumatic activating components controlled, for example, by solenoid valves are suitable, although relay-(or power transistor-)controlled electromechanical converters are also suitable.

The height to which the product magazine is filled or in other words the ejection operation, is monitored by sensors 21 which can, for example, comprise light barriers (FIG. 5). Alternatively, the weight of the stack 2a of merchandise items which, of course, is proportional to the number of items, can be measured by force receptors, such as strain gauges provided on the bearing surfaces of the magazines. A force proportional signal is generated which indicates how many items 2 remain in the magazine 20 and whether the last ejection command was actually carried out. With this particular design, a single sensor is suffient to monitor both the filling level as well as the ejection operation simultaneously. It is of course also possible to use suitable sensors for measuring the length of the product stack 2a, although a single sensor would also be sufficient, whereby, for example, optical or acoustical telemetric principles for measuring a distance can be used. It is also possible to use capacitative or inductive measurement techniques, for example, between the magazines 20 and the shelf floors 10 or between the two magazine side surfaces to obtain information on the product stack 2a.

According to the preferred embodiment of the invention described above, the actual control of all moving elements is carried out by a computer. In another preferred design of the invention, the commands are transmitted from a central computer installation to decentralized installations (microprocessors) which are assigned to each shelf block $1_n$, the latter being controlled by these decentralized installations in blocks. The success or failure commands are returned to the central computer where, for example, in the case of a breakdown (such as a stuck ejector mechanism or an empty magazine), warning lights and similar optical means provide a direct indication to the operating personnel of the obstructed block. If the individual blocks are provided with decentralized computer units, a greater degree of freedom is possible in the design of the warehouse which can be advantageous in the event of changes in the product line.

Obviously, numerous modifications and variations are possible in the light of the above teachings. It is therefore to be understood that within the scope of the claims appended hereto, the invention may be practiced otherwise than as specifically disclosed herein.

What is claimed is:

1. A computer-controlled handling process for automatically stacking, storing and removing various types of packaged merchandise items from large warehouse installations, wherein the merchandise items are withdrawn in sequence from respective magazines associated with several shelves and loaded into passing transport containers, comprising the steps of: in a warehouse installation including a plurality of shelves which are subdivided into successively arranged blocks, the shelves of each block being associated with the respective product magazines, loading the various types of merchandise items into the product magazines while simultaneously removing the merchandise items from the shelves of a certain block by ejecting the merchandise items from the magazines associated with that certain block by a remote-controlled ejection device when a transport container has arrived at a block preceding that certain block, collecting and then simultaneously loading the merchandise items into the transport container when the latter arrives at the certain block and causing the transport container to continue its movement immediately after having been loaded, and wherein the speed of the transport container is adjusted to substantially correspond to the sum of the ejection, collection and loading times so that removal of the merchandise items takes place in a minimal time.

2. A process as recited in claim 1, including the steps of loading several magazines with items of the same type of merchandise for ejection of a number of items of that type and wherein a different number of items are ejected 1 to n times from each of the several magazines, and wherein the number of items ejected from each magazine is $(n+1)^m$, whereby $m=0$ for the first magazine, $m=1$ for the second magazine and so on, whereby the speed of removal of the merchandise items is maximized.

3. A process as recited in claim 1 including the steps of loading several magazines with items of the same type of merchandise for ejection of a number of items of that type and wherein a different number of items are ejected 1 to n times from each of the several magazines, and wherein the number of items ejected from each magazine is preset.

4. A process as recited in claim 1 including the step of directing the ejected merchandise items from several areas of the certain block simultaneously to a single collecting point, preferably arranged centrally of the block, and by directing the items from the end and from the beginning of the block simultaneously in opposing directions towards the collecting point to thereby minimize the time for collecting the merchandise items.

5. A process as recited in claim 1 wherein the loading time is minimized by depositing all of the items simultaneously in the transport container.

6. A process as recited in claim 4 wherein each magazine is loaded from an upper region thereof allowing a simultaneous ejection of items from a lower region of each magazine and directing the ejected items on conveyor means to the collecting point.

7. A system for carrying out a computer-control handling for automatically stacking, storing and removing various types of packaged merchandise items from large warehouse installations, wherein the merchandise items are withdrawn in sequence from respective magazines associated with several shelves and loaded into passing transport containers, comprising the steps of: in a warehouse installation including a plurality of shelves which are subdivided into successively arranged blocks, the shelves of each block being associated with the respective product magazines, loading the various types of merchandise items into the product magazine while simultaneously removing the merchandise items from the shelves of a certain block by ejecting the merchandise items from the magazines associated with that certain block by remote-control ejection means when a transport container has arrived at a block preceding that certain block, collecting and then simultaneously loading the merchandise items into the transport container when the latter arrives at the certain block and causing the transport container to continue its movement immediately after having been loaded, and wherein the speed of the transport container is adjusted to substantially correspond to the sum of the ejection, collection and loading times so that removal of the merchandise items takes place in a minimal time, said system including at least one computer, remote-controlled actuating elements, shelves, shelf floors associated with product magazines, transport containers for stacking and emptying the magazines, and conveyor means, said shelves in said blocks each being subdivided into several shelf floors and said product magazines being attached to said shelf floors, said shelf floors being obliquely oriented and arranged with the normals to the planes in which said floors are situated substantially in the longitudinal direction of the shelf blocks, said product magazines having ejector means mounted at their lower ends for transferring the merchandise items to said conveyor means, and wherein the conveyor means collect the ejected merchandise items of a block in a release mechanism from which the merchandise items are loaded into the transport containers mounted on said conveyor means, and wherein the operation of the system is controlled by a computer and that replacement merchandise items to be stacked are located in said transport containers for stacking, the containers in which replacement pieces are located being directed along different routes than those of the transport containers in which ejected items are located for withdrawal of the merchandise items.

8. A system in accordance with claim 7, wherein the shelf floors in the horizontal direction extend substantially vertically with respect to the longitudinal axis of the block, preferably on telescoping guide rails, and can be withdrawn a sufficient distance for the magazines to be refilled.

9. A system in accordance with claim 7 wherein the ejectors include pivotably mounted longitudinally sliding levers situated below the plane of the shelf floors and substantially vertical, pressure means for urging said levers in the direction of a stack of merchandise items and at an interval between the stack and the pivot axis, said levers having at their upper ends extensions having arcuate cross-sections having radii of curvatures with the pivot axis at their center, whereby the pressure means generate a sufficiently small force that the lever is slid back sufficiently far from the merchandise stack in the magazine after the ejection of one or more items, that the lowest item in the stack comes to rest on a stop at the lower end of the magazine, said force being sufficiently great that the lever, after pivoting back behind the merchandise stack, extends by a preset magnitude to allow the next item to be removed from the shelf floor and be ejected from the magazine, whereby at least that item above the item to be ejected is held in place by a retainer and the lever pivoted by means of operating elements.

10. A system in accordance with claim 9, wherein the magnitude of extension to open the ejector after a back-swing movement thereof is determined by remote-controlled actuation elements as is the position of the retainer adjustably seated in the direction of the magazine.

11. A system in accordance with claim 7, wherein the conveyor means to which the ejectors transfer the merchandise items are situated below the magazines such that the conveyor means convey the ejected items from the two opposed ends of the block towards its center wherein the ejected items are collected in the release mechanism.

12. A system in accordance with claim 7, wherein the release mechanism includes a trap door which is opened by remote-controlled actuating means so that the pieces fall into the transport containers located below them.

13. A system in accordance with claim 7, wherein the transport containers for removal of the pieces include code number means on at least one of their surfaces which are readable by code readers located at each block and wherein the conveyor means upon which the transport containers are mounted include continuously operating belts located below the blocks, and wherein gripping devices with remote-controlled operating mechanisms are arranged such that the transport containers on the conveyor belt can be detained below the release mechanism.

14. A system in accordance with claim 7, wherein the magazines include sensor means for monitoring the filling level of the magazine and the ejection of the items, said sensor means being connected to the computer.

15. A system in accordance with claim 7, wherein the remote-controlled actuating means are activated by the computer which comprises a central computer to which order data is fed.

16. A system in accordance with claim 7, wherein each shelf block is equipped with a separate computer which is connected to the remote-controlled actuating means, the sensors, the reading device and the central computer.

17. A system in accordance with claim 7, wherein the transport containers for stacking or refilling of the magazines, in which the replacement items are transported, include second conveyor means for guiding the pieces ejected by the ejectors to the release mechanism during the refilling of the magazines.

* * * * *